INVENTOR.
George Scourtes
BY
Harness, Dickey & Pierce
ATTORNEYS

United States Patent Office 3,225,596
Patented Dec. 28, 1965

3,225,596
CONDITION INDICATING SYSTEM
George Scourtes, Detroit, Mich., assignor, by mesne assignments, to Lynch Corporation, Anderson, Ind., a corporation of Indiana
Filed Oct. 27, 1960, Ser. No. 76,085
16 Claims. (Cl. 73—361)

This invention relates to electrical indicating systems and the principles of the present invention are representatively embodied in electrical indicating systems including thermocouples and strain gauges as the condition sensing elements.

One form of electrical indicating system is the null-balance type in which a sensed signal is compared to a reference. The amount of correction required to obtain a balance is then a measure of the magnitude of the sensed signal. The amount of correction required to effectuate the null-balance can be provided and indicated by appropriate means.

In a typical system of this type, the sensed signal is an electrical potential or current and in many instances is quite small in magnitude. For example, the output of a thermocouple may be of the order of 5 millivolts while the output from a strain gauge bridge may be 10 millivolts. In prior null-balance indicating systems the reference signals are derived from potentials which are small in magnitude, being of the same order as the sensed potential. With such systems, slight changes in the characteristics of the electrical circuits or components used are significant as possible sources of error. Thus, changes in contact resistance, generation of thermal E.M.F.'s or changes in contact potentials become significant since only slight changes in potential produce an appreciable percentage error.

Any uncompensated nonlinearity of the sensing elements will also lead to erroneous output indications in systems of this type.

A further possible source of error in the indicated output in these null-balance type of systems is in the loading of the various components of the electrical circuit itself, as for example, loading of a slidewire type variable voltage divider which is or may be used to provide the comparison or reference signal.

It has been the practice in many such null-balance devices to utilize separate sources of potential for obtaining the signal potential and for obtaining the standard comparison potential. Any unequal fluctuation occurring between the individual power supplies tends to create errors in the final indicated output.

An object of this invention is to minimize errors due to generated thermal E.M.F.'s in an electrical indicating system.

A further object of this invention is to minimize errors due to contact potential arising in an electrical indicating system.

A still further object of this invention is to minimize errors due to changes in potential of the power supply in electrical indicating apparatus.

Another object of this invention is to minimize errors due to the loading of the various electrical components in an electrical indicating system.

Another object of this invention is to compensate for nonlinearities of the condition sensing element in an electrical indicating system.

Still another object of this invention is to conjointly compensate for errors due to the nonlinearities of the condition-sensing element and errors due to loading in an electrical indicating system.

Other objects, features, and advantages of the present invention will become apparent from the subsequent description taken in conjunction with the accompanying drawings, in which.

Figure 1:
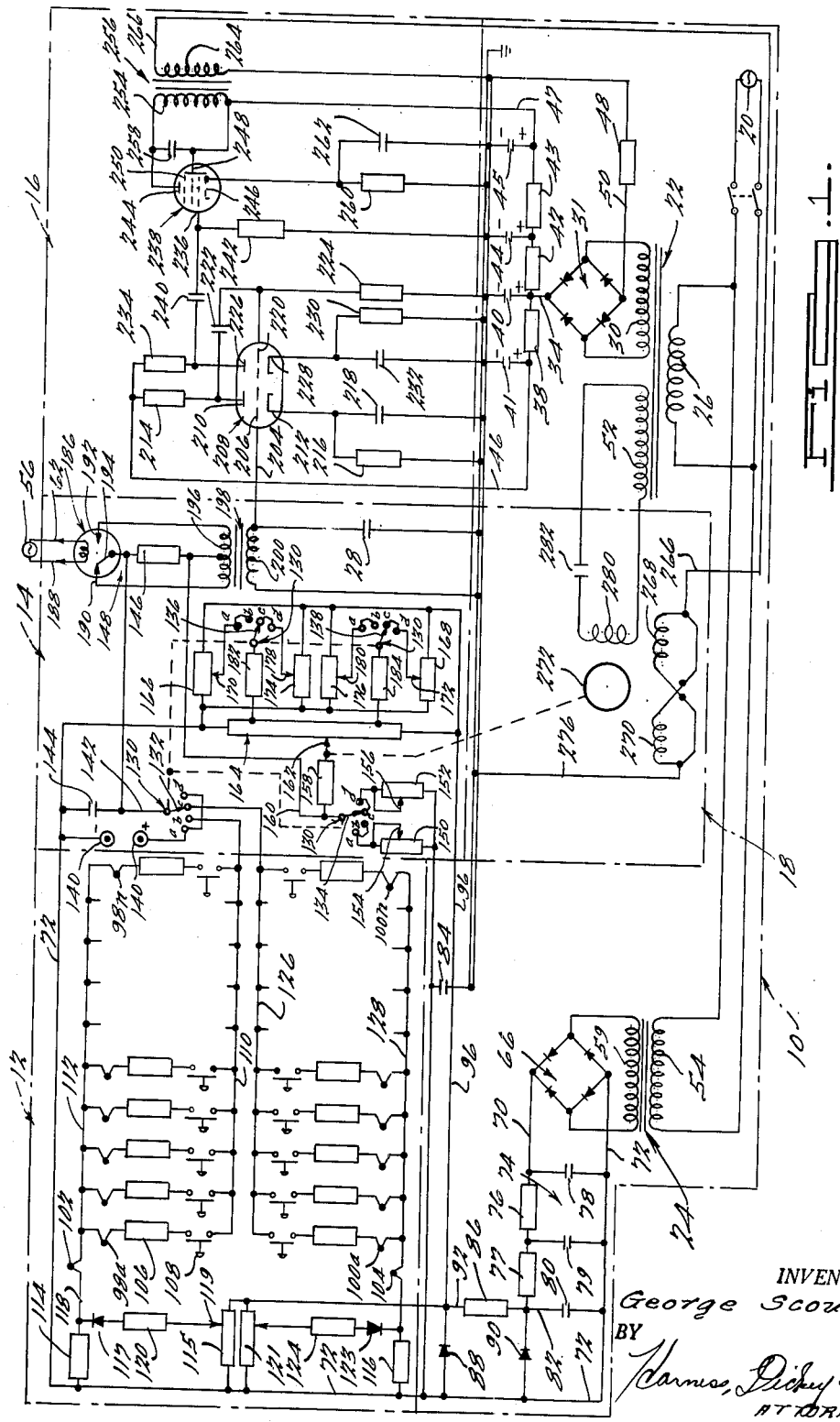
FIGURE 1 is a schematic representation of en embodiment of the invention as utilized in a temperature indication system.

A temperature measuring system including thermocouples as the sensing means and embodying certain of the principles of the present invention is illustrated in FIGURE 1. The system as there shown comprises a power supply 10, a sensing circuit 12, a balance circuit 14, and amplifying circuit 16, and drive means 18. The power supply 10 includes a source of potential 20 for applying an alternating voltage across the primary winding 26 of transformer 22 and across the primary winding 54 of transformer 24. The alternating current potential induced across the secondary winding 30 of transformer 22 is rectified by a bridge rectifier 31, one output terminal of which is connected to ground through resistor 48 and the other output terminal of which is connected to conductor 34. The resultant rectified potential is smoothed by a resistance capacitance filter comprising resistor 38 and capacitors 40 and 41 to develop a direct voltage between conductor 46 and ground and is smoothed by a plural-section resistance-capacitance filter comprising resistors 42 and 43 and capacitors 40, 44 and 45 to develop a direct voltage between conductor 47 and ground. These direct voltages are applied to amplifier circuit 16 for a purpose to be noted hereafter.

The alternating voltage appearing across secondary winding 59 of transformer 24 is impressed across a full-wave rectifier bridge 66. The rectified output voltage from the bridge rectifier 66, appearing between conductors 70 and 72, is filtered by filter network 74 which comprises resistors 76 and 77, and capacitors 78, 79 and 80. The output of the filter network 74 appears between the conductor 82 and conductor 72 which is connected to ground through capacitor 84. The voltage between conductor 82 and conductor 72 is applied across a voltage regulating network comprising zener diodes 88 and 90 and resistor 86 and the resultant regulated direct voltage appearing between conductors 92 and 72 is applied to the balance circuit 14 for a purpose to be noted hereafter.

The sensing circuit 12 comprises two groups of thermocouples with hot junctions $98a$ through $98n$ and $100a$ through $100n$ and the associated cold junctions 102 and 104 respectively. In the preferred embodiment the hot junctions $98a$ through $98n$ are of the Alumel-Chromel type and the hot junctions $100a$ through $100n$ are of the iron-constantan type. The Chromel-Alumel thermocouples are used to detect temperatures up to 2400° F. while the iron-constantan thermocouples are used to detect temperatures up to 1200° F.

In series arrangement with each of the hot junctions $98a$ through $98n$ is a resistor and a switch such as resistor 106 and switch 108. When used in relatively high-impedance circuits, as shown, the thermocouples act, in essence, as current generators. As representative values, with thermocouple resistance ranging from 5–10 ohms and with a possible lead resistance up to 100 ohms, resistor 106 may be selected to have a value of 5000 ohms to render the variations in lead resistance negligible. The plurality of hot junction-resistor-switch combinations are joined in parallel connection by means of conductors 110 and 112. The switches enable one or more of the hot junctions to be connected as a sensing means at one time. Thus in a particular application, an average reading can be obtained over a surface or individual readings can be obtained in order to determine the presence of hot spots.

The cold junction 102 is connected in series arrangement with the plurality of hot junctions 98a through 98n by means of the conductor 112. In order to provide a direct-reading output indication, means are included in the illustrated circuit to effectively shift the reference temperature or cold-junction temperature from its actual value to simulate a condition in which the cold junction is at zero degrees Fahrenheit. This is accomplished in the illustrated circuits by a voltage divider comprising a variable resistor 115, a resistor 120, a temperature compensator 117 and a resistor 114. A zero degree Fahrenheit ambient temperature can be simulated simply by adjusting the wiper 119 associated with the variable resistor 115 until the proper potential is impressed across resistor 114. Since the resistor 114 is in series with the thermocouple associated with the cold junction 102, the proper compensating potential across resistor 114 will provide a total potential indicative of the true total temperature. The temperature compensator 117 is a type of semi-conductor called a stabistor. The stabistor maintains a constant voltage drop at any given temperature but provides a change in voltage drop which is substantially linear with changes in temperature. Thus once the resistor 115 has been adjusted to simulate the desired ambient temperature, any changes in the surrounding temperature affecting the cold junction 102 will be automatically compensated by the stabistor 117, obviating the necessity for any further change in the setting of resistor 115.

A variable resistor 121, a resistor 124, a temperature compensator 123 and a resistor 116 associated with the iron-constantan thermocouple circuitry serve a corresponding function to the voltage divider discussed above and the conductors 126 and 128 connect the plurality of hot junctions 100a–100n in a parallel arrangement in a manner similar to that discussed with regard to conductors 110 and 112.

In the Chromel-Alumel thermocouple circuit, upon closing one or more of the plurality of switches represented by switch 108 and with a difference in temperature existing between the hot junctions 98a–98n and the cold junction 102, a difference in potential will arise between these junctions causing current to flow through the resistors of which resistor 106 is representative. The potential from conductor 110 to conductor 72 will be the sum of the thermocouple potential appearing across the hot junctions 98a–98n, cold junction 102 and resistor 106 and the simulating potential impressed across resistor 114 and will be indicative of the true temperature.

This output from the Chromel-Alumel thermocouples is applied through a switch 130 to the balance circuit 14 by means of conductor 110. Likewise, the output from the iron-constantan thermocouples is applied through switch 130 and conductor 126 to the balance circuit 114.

The switch 130 has four movable contacts 132, 134, 136, and 138 ganged to move in unison through positions denominated a, b, c, and d. The conductor 110 leads to the b position of the contact 132 of switch 130 while the conductor 126 leads to the c position of the contact 132. A calibration position a is provided for calibration of the device for using the Chromel-Alumel thermocouple while another calibration position d is provided for using the iron-constantan thermocouples. The contact 132 is coupled to conductor 72 by means of conductor 142 and capacitor 144 which provides a filtering of spurious A.-C. signals. The conductor 142 also leads to resistor 146 in the chopper circuit 148. The contact 134 alternatively connects calibrating variable resistances 150 and 152 in the circuit in the a–b and c–d positions, respectively. The conductor 160 connects one end of the resistance 158 and contact 134 to the side of resistor 146 opposite from conductor 142. The other end of the resistor 158 is connected to a wiper 162 of a slide wire 164. In the preferred embodiment the slide wire has a resistance of 1000 ohms, while resistor 158 has a value of 200,000 ohms. The slide wire 164 is connected between conductors 96 and 72 and thus has the potential at the output of the filter network 74 impressed thereacross. This potential can be of the magnitude of from 8–10 volts.

Depending upon the position of the wiper 162 along the slidewire 164 a potential will appear between wiper 162 and conductor 72. This potential is substantially reduced to the range of potentials anticipated from the output of the thermocouples by the voltage divider comprising resistor 158 and resistor 150 (or 152). Thus, a small potential from conductor 160 to conductor 72 is impressed across the resistor 150 or 152, depending upon the position of the contact 134. In the preferred embodiment resistors 150 and 152 have a value of 1000 ohms each.

With the switch 130 in the b position, the potential appearing across the resistor 146 is the difference in potential between the potential from conductor 160 to conductor 72 and that from conductor 110 to conductor 72, which includes the potentials as previously discussed.

As mentioned before, it is common practice to utilize a potential of somewhat the same magnitude as the output of the thermocouple across the slidewire. This would be approximately 50 millivolts if a thermocouple is used as the sensing element. It can be appreciated that by using a balancing potential of 50 millivolts, the errors present due to potential drops resulting from thermal E.M.F.'s and changes in contact potential as well as changes in contact resistance become significant. But in the system as described above, even a drop of one millivolt due to the factors mentioned above would produce an error of only approximately .01% of the magnitude of potential used, whereas with the small potentials as utilized in the past, the error would be of a magnitude of approximately 2%.

One of the problems with using a large potential across the balancing circuit has been the resultant loading effect of the other components in the circuitry. This effect has been minimized by using a voltage divider comprising the relatively large resistance 158 (200,000 ohms) in conjunction with the wiper 162 thereby minimizing the amount of current drawn. Otherwise stated, the voltage divider comprising resistor 158 and resistor 150 (or 152) is selected to have a relatively high resistance.

A balanced condition is attained when the potential difference across the resistor 146 is zero, i.e., the potential difference from conductor 142 to conductor 72 equals that from conductor 160 to conductor 72. The total travel of the wiper 162 on slidewire 164 from a zero position with no signal in to a balanced position with a signal in is a measure of the magnitude of the signal. Thus an indicating device could be used which would give an indication in relation to the travel of the wiper 162.

When a slidewire such as 164 is utilized in the arrangement shown in FIGURE 1, unequal loading of the slidewire 164 occurs depending upon the position of the wiper 162 along the slidewire 164. The loading which is a maximum at the center position diminishes to a minimum at either end position. The loading effect is caused by the resistances 158, 146, 106 and 150 (or 152) forming a parallel path with that portion of the slidewire 164 and reducing the total resistance from wiper 162 to conductor 72. Assuming the wiper 162 to be in the center position the resistance from the wiper 162 to conductor 72 is less than the resistance from wiper 162 to conductor 96. However, if an indicating devicing having a linear scale were being used to indicate the magnitude of the quantity being measured in relation to the total travel of the wiper 162, it would read half scale when in reality a balancing potential of less than half of the total potential across the slidewire was used, producing an output indication which is non-linear with respect to the movement of the wiper 162.

In the past one way of minimizing this error was to wind the slidewire specifically to compensate for the unequal loading effect. The response of the thermocouples or any sensing device used is not always linear. Thus, in order to compensate for this possible source of error by the method used in the past, a separate slidewire had to be wound specially for each type of sensing unit. In the preferred embodiment shown in FIGURE 1, a simplified compensating network has been provided utilizing standard components, thereby alleviating the necessity of providing a specially wound slidewire 164 for each different type of thermocouple.

The maximum loading error occurs at the center of the slidewire 164 and could be compensated at that point by connecting from the midpoint of slidewire 164 to conductor 96 a resistor equal in value to the resistance paralleling the other half of the slidewire 164. Compensating resistors 182 and 184 are connected at opposite end portions of slidewire 164 at points of approximately 15–30% of the total value of the slidewire, depending upon the desired points of compensation. Resistor 182 is connected through contact 136 (in a–b position) to wiper 170 on a variable resistor 166 which has its total resistance in parallel connection across the slidewire 164. In a similar manner, resistor 184 is connected through contact 138 (in a–b position) to wiper 180 in a variable resistor 176 which has its total resistance in parallel connection across the slidewire 164. By moving the wipers 170 and 180 and adjusting the portions of resistors 166 and 186 across the portions of the slidewire, compensation can be obtained at each point and it can be attained in two directions, i.e., either to raise or lower the total resistance from the end of the slidewire 164 to the point of connection of the compensating resistor with respect to the total resistance from the other end of slidewire 164 to that same point. Adjustments are made by the wipers 170 and 180 until the optimum compensation is attained over the full range of the slidewire 164, i.e., until the minimum deviation from linearity between the travel of wiper 162 and the magnitude of the sensed condition is attained over the full range of slidewire 164. Variable resistances 168 and 174 are associated in a similar manner with the compensating resistors 182 and 184 when the contacts 136 and 138 are in the c–d positions. In the preferred embodiment the variable resistors 166, 168, 174, and 176 are 0–1000 ohms while resistors 182 and 184 are 10,000 ohms. It is feasible that in utilizing a specific thermocouple with specific circuitry, fixed resistors could be selectively located along the slidewire 164 to provide compensation. In other instances, for the desired accuracy, a plurality of resistors may be required to compensate the slidewire and sensing means. In the embodiment as described any of a given type of thermocouple can be used and compensated to obtain a high degree of accuracy. In a constructed embodiment, the deviation of the device from linearity was reduced from approximately .3% to approximately .05%.

Calibration of the instrument can be made by placing the wipers 132, 134, 136, and 138 of switch 130 in the a or d positions, depending upon the bank of thermocouples to be calibrated. A calibrating or standard potential 140, which could take the form of a standard cell of a known voltage, is thereby connected between conductor 142 and conductor 72 in lieu of the thermocouples. Knowing the response of the thermocouple, the desired indication or reading on the indicating means (not shown) corresponding to the voltage as applied at the calibrating voltage 140 is known. Calibration is performed by altering the potential difference from conductor 160 to conductor 72 by adjusting either wiper 154 or 156 of the calibrating resistors 150 or 152, respectively, depending on whether the switch 130 is in position a or d. Assuming the switch 130 to be in the a position, the wiper 154 is moved along the calibrating resistor 150 until the wiper 162 of the slidewire 164 provides the proper reading for an associated indicating means (not shown), i.e., by a driving means to be described later. The operation is similar when the switch 130 is in the d position for the second set of thermocouples.

Assuming now that a difference in temperature exists between the hot junctions 98a–98n and cold junction 102, with the switch 130 in the b position, a potential difference or error signal will appear across the resistor 146. As vibrating member 194 in chopper 186 oscillates from contact 190 to 192 a direct current is caused to flow alternately through the two halves of the primary winding 196 of transformer 198 inducing an alternating voltage in secondary winding 200. The chopper 186 is driven by a source of potential 56 having the same frequency and phase as the source of potential 20. The magnitude of the potential appearing across the secondary 200 will depend on the magnitude of the voltage drop occurring across the resistor 146. The phase of the potential appearing across the secondary 200 with reference to the phase of the source 20 will depend upon the polarity of the potential difference appearing across resistor 146. Thus, depending upon the magnitude of the unbalance present in the system, a potential of corresponding magnitude will appear at the conductor 204 and is capacitively coupled by a capacitor 28 to control grid 206 of a first of two triodes in valve 208 in the amplifying circuit 16.

The first triode of valve 208 is of the type whereby the current flow between the principal electrodes 210 and 212 is controlled by the potential between grid 206 and electrode 212. Potential from power supply 10 via conductor 46 is used to establish a potential difference between electrodes 210 and 212. A bias between grid 206 and electrode 212 (which is a function of the current passing between the electrodes 210 and 212) is provided in a conventional manner by means of resistor 216 and capacitor 218. Amplification of the error signal results in a potential appearing across load resistor 214. The amplified signal appearing across load resistor 214 is coupled by means including capacitor 222 to the grid 220 of a second triode in the valve 208. The second triode of valve 208 is similar to the first with a control grid 220 controlling the current flow between electrodes 226 and 228 depending upon the bias between grid 220 and electrode 228 as provided by resistor 224 and the biasing network comprised of resistor 230 and capacitor 232. Potential from power supply 10 via conductor 46 establishes a potential difference between electrodes 226 and 228. Amplification again occurs and the amplified error signal is coupled from the electrode 226 by means including capacitor 240 to the control grid 236 of a power amplifying valve 238. In the preferred embodiment the valve 238 is a pentode type vacuum tube in which the control grid 236 is connected to ground via resistor 242. The valve 238 also has a plate 244, a cathode 246 (principal electrodes), a screen grid 248, and a suppressor grid 250 which is connected to cathode 246. The screen grid 248 of valve 238 is connected to power supply 10 via conductor 47 while the plate 244 is connected to power supply 10 via conductor 44 through primary winding 254 of transformer 256. The valve 238 is made self-biasing by the insertion of resistor 260 and capacitor 262 in the circuit from cathode 246 to ground. The amplified A.-C. output from the valve 238 appears across the primary 254 of the transformer 256 and the capaictor 258. This parallel combination forms a tank circuit which is tuned to the desired alternating current frequency (e.g., 60 cycles per second) so that an amplified A.-C. potential of the operating frequency appears across the secondary 264 of the transformer 256.

The output at the secondary 264 of output transformer 256 is then fed by means of the conductor 266 to the drive means 18 and more specifically to windings 268 and 270 of servo motor 272. The windings 268 and 270 are connected to ground via conductor 276. The motor 272 is a two phase motor with shorted armature. The second phase is provided by winding 280 which is energized by means of secondary 52 of transformer 22. The potential across winding 280 is phase shifted by means of capacitor 282 in order that the potential at this winding will be in quadrature with that appearing across windings 268 and 270. The motor 272 is coupled to wiper 162 such that, depending upon the magnitude and phase of the amplified signal, rotation of the servo motor 272 drives the wiper 162 in a direction to diminish the error signal present. As this is done the same sequence of events as previously described occurs and a diminishing potential difference appears across the resistor 146 and hence at conductor 266 until a final null balance is obtained. The servo motor 272 is preferably also coupled to a suitable visual indicating means (not shown) such as a cyclometer mechanism to provide a direct read out.

If the temperature rises and the output from the thermocouple comprising hot junctions 98a–98n and the cold junction 102 increases, the necessary corrections will automatically be performed by the wiper 162 accordingly. If the temperature drops the potential appearing between the hot junctions 98a–98n and the cold junction 102 decreases thereby reversing the polarity of the voltage occurring across the resistor 146, reversing the phase with respect to the source 20 of the alternating voltage induced in the secondary 200 of transformer 198, and thereby reversing the phase of the alternating voltage applied across field windings 268 and 270 to cause the servo motor to be driven in the opposite direction until a null-balance again is obtained.

Figure 2:
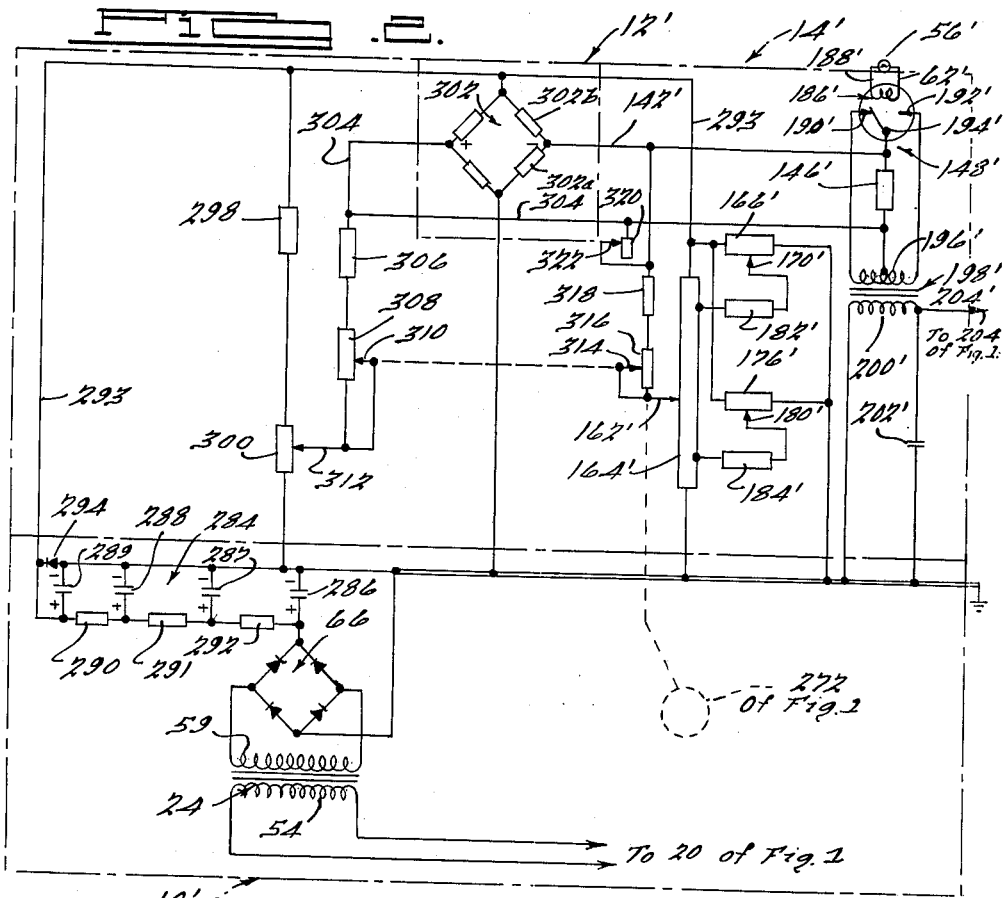
FIGURE 2 is a schematic representation of an embodiment of the invention as utilized in a force indicating system embodying a strain gauge.

A second embodiment utilizing the principles of the circuitry previously described but to be operated with strain gauges to provide either strain or force indications is shown in FIGURE 2. Since the circuits in FIGURES 1 and 2 are similar, only a portion of the circuit is shown in FIGURE 2. In FIGURE 2 the power supply 10′ differs from the power supply 10 only in the filter network 284 which is different than the corresponding filter network 74 in FIGURE 1. One end of the rectifier bridge 66 is connected to ground while the other end is connected to the filter network 284. The filter network 284 comprises capacitors 286, 287, 288 and 289 and resistors 290, 291 and 292. One end of the filter network 284 is connected to ground and the other end is connected to conductor 293. Voltage regulation is maintained by a zener diode 294 which is connected from conductor 293 to ground. The regulated potential from conductor 293 to ground is connected across a voltage divider comprising a resistor 298 and potentiometer 300 across two opposite points of a strain gauge bridge 302 and across the slidewire 164′.

The output from a strain gauge bridge is approximately 10 millivolts. As mentioned before, in the past a potential of corresponding magnitude was also applied across a slidewire, leading to significant errors due to contact resistance, thermal E.M.F.'s, contact potential, etc. In the emboidment shown in FIGURE 2, a high potential (8 volts) is used across that slidewire to minimize these errors.

In some instances in the past separate power supplies were used to energize the bridge and the slidewire. In the arrangement shown in FIGURE 2, the same power supply is used and hence any fluctuation occurring in the power supply 10′ such as to affect the output at conductor 293 would be compensated since corresponding changes would occur across both the bridge 302 in the sensing circuit 12′ and the sidewire 164′ in the balance circuit 14′.

A strain gauge as utilized in the embodiment shown in FIGURE 2 is a device producing a change in electrical resistance as a function of the change in strain on the part to which it is attached. If a plurality of strain gauging resistors are placed in a bridge arrangement and the bridge is initially balanced, no potential difference will occur across the two other points of the bridge adjacent to the points across which the energizing potential is impressed. If one of the strain gauging resistors is strained and changes its resistance, an unbalance occurs and a potential difference appears across the bridge having a magnitude which varies as a function of the unbalance. The strain gauge bridge could be located in a load cell (not shown) or could be located in any particular manner for the measurement of stress or load. In the particular embodiment shown in FIGURE 2 and the discussion to follow it will be assumed that the strain gauge bridge 302 is located in a load cell adapted for measuring load.

The indicating or balancing operation of the circuit as shown in FIGURE 2 is similar to that as dicussed with respect to FIGURE 1. The chopper circuit 148′ in FIGURE 2 is identical to that in FIGURE 1 with the elements 56′, 62′, 146′, 186′, 188′, 190′, 192′, 194′, 196′, 198′, 200′ and 202′ serving the same functions as the elements of FIGURE 1 bearing the corresponding unprimed numbers. The circuitry following the conductor 204′ of FIGURE 2 is identical to that following the conductor 204 in FIGURE 1. Assuming now that there is an unbalance in the circuit of bridge 302, a potential difference will occur across the points of the bridge connected to conductors 304 and 142′ and hence across across a resistor 146′ which is connected between those conductors. The difference in potential is detected by the chopper circuit 148′ in the manner discussed with refernce to FIGURE 1 with a resultant output signal occurring across the secondary 200′ of the transformer 198′. This signal is amplified in amplifying circuit 16 (FIGURE 1) resulting in an A.-C. potential occurring at 266 having a phase and magnitude depending upon the magnitude and polarity of the potential difference occurring across resistor 146′. This amplified potential causes rotation of the servo motor 272 such as to drive the wiper 162′ in an appropriate direction such as to provide a decreasing difference in voltage across resistor 146′ until a null balance is reached. At this point the wiper 162′ will be at a point on the slidewire 164′ such as to exactly create equal potentials between conductor 142′ and ground and conductor 304 to ground such that the output appearing across the secondary 200′ in the chopper circuit 148′ is zero.

The balancing operation of the potential appearing across resistor 146′ can be analyzed in two ways: (1) a balancing of potential and (2) a balancing of resistances. In the first analysis a balance condition can be stated to have occurred when the potential from conductor 142′ to ground equals the potential from 304 to ground. The potential from conductor 142′ to ground is dependent upon the voltage divider network comprising slidewire 164′, resistor 316, resistor 318, the resistance of strain gauge element 302a, and the resistance of strain gauge element 302b. For a balanced condition when the potential at the wiper 162′ to ground is greater than that from conductor 142′ to ground, a corrective current will flow through the voltage divider network comprising that portion of the slidewire 164′ from conductor 293 to wiper 162′, the resistor 316, resistor 318 and the resistance of the strain gauge element 302a. For a balanced condition when the potential at the wiper 162′ to ground is less than that from conductor 142′ to ground, a corrective current will flow through the voltage divider comprising that portion of the slidewire 164′ from wiper 162′ to ground, the resistor 316, resistor 318 and the resistance of the strain gauge element 302b. The amount of corrective current flowing and its direction will depend upon the position of the wiper 162′ along the slidewire 164′. The amount of resultant corrective voltage appearing across the strain gauge element 302a or 302b and measurable from conductor 142' to ground will depend upon the relative magnitudes of the parameters involved in the voltage dividing network. Since, for correction purposes, all of the parameters are fixed save those related to the position of the wiper 162' along the slidewire 164', correction is obtained by varying the position of the wiper 162'.

The corrective operation of the circuit can also be analyzed as a balancing of resistances. In moving the wiper 162' along the slidewire 164' the total amount of resistance in each of the two legs of the bridge 302 including gauge elements 302a and 302b, respectively, is changed. The portions of slidewire 164' on either side of wiper 162' are each connected in parallel across the gauge elements 302a and 302b by way of the resistor 316 and resistor 318. Thus, for example, if the wiper 162' is moved along the slidewire 164' so as to cause an increase in resistance in the one leg of the bridge 302 associated with gauge element 302a, a corresponding decrease in resistance is caused in the other leg of the bridge 302 associated with gauge element 302b. The wiper 162' is moved until a balance of resistances of the legs of the bridge 302 is once more restored.

As mentioned with respect to the discussion of the circuit in FIGURE 1, the values of the resistors associated with the wiper 162' (i.e., 316 being 0-10,000 ohms and 318 being 55,000 ohms) are relatively high as compared to the resistance of the slidewire (1000 ohms). The resistors, 316 and 318, are serially connected from the wiper 162' to one side of the bridge 302. These high values of resistance tend to minimize any loading effects in the external portion of the circuit due to the high potential (8 volts) used across the slidewire 164'. In the preferred embodiment shown in FIGURE 2 the slidewire 164' would be at an extreme or near zero voltage position along the slidewire 164' for the zero load input to the strain gauge bridge 302. The bridge 302 is arranged such that upon compression of the load cell (not shown) a potential difference is created causing the wiper 162' to be moved in a direction of increasing potential along the slidewire 164' by the servo motor 272. Tensile forces can be measured by interchanging the leads 142' and 304. Both tensile and compressive forces can be read without the necessity of altering the wiring of the bridge 302, by slight alterations of the circuit. In that case the wiper 162' would be at the midpoint of the slidewire 164 at zero load. In the preferred embodiment, however, as shown in FIGURE 2, only unidirectional forces are measured at any one time.

Initially the strain gauge elements constituting the strain gauge bridge 302 are at zero load condition. Any necessary adjustment in order to obtain a zero reading of the indicating means associated with the wiper 162' (not shown) or with the servo motor 272 can be made by adjusting wiper 312 on a zero adjust potentiometer 300 associated with the potential dividing circuit connected from conductor 293 to ground and including resistor 298. The wiper 312 is serially connected with a calibrating potentiometer 308 and resistor 306 to the bridge 302 on a side opposite the connection of wiper 162' to the bridge. As this adjustment is made a change in potential is caused to occur at conductor 304 such as to cause an unbalance. The necessary corrective action occurs automatically and the wiper of the slidewire 164' is moved by servo motor 272, changing the potential appearing at the conductor 142' until a zero reading or indication is obtained. In the preferred embodiment the potentiometer 300 has a value of 0-50 ohms and resistor 298 a value of 500 ohms. Once this is done calibration of the device can be made by putting a known load upon the load cell (not shown). At that time adjustment is made of the ganged wipers 310 and 314 associated with the calibrating potentiometers 308 and 316, respectively, until the indicating means (not shown) associated with the wiper 162' and with the servo motor 272 indicates the proper magnitude of force. The device is then ready for operation. In order for both sides of the bridge 302 to be balanced, the potentiometer 308 is of the same magnitude as 316 and resistor 306 is of the same value as 318. A built-in calibrating means can be provided in the circuit of bridge 302 eliminating the necessity for loading the load cell with a known force, i.e., a standard resistor could be shunted across one leg of the bridge circuit 302 during calibration, giving a known change in resistance which would be the equivalent of a known load.

The conductor 142' is connected to the conductor 304 by means of damping control potentiometer 320. The damping control potentiometer 320 has associated with it a wiper 322 whereby the resitance appearing between the conductors 142' and 304 can be varied. In the preferred embodiment as shown in FIGURE 2 the damping control potentiometer 320 has a value of 1000 ohms. The purpose of potentiometer 320 is to provide damping such as to eliminate any oscillation or hunting in the circuit.

Figure 3:
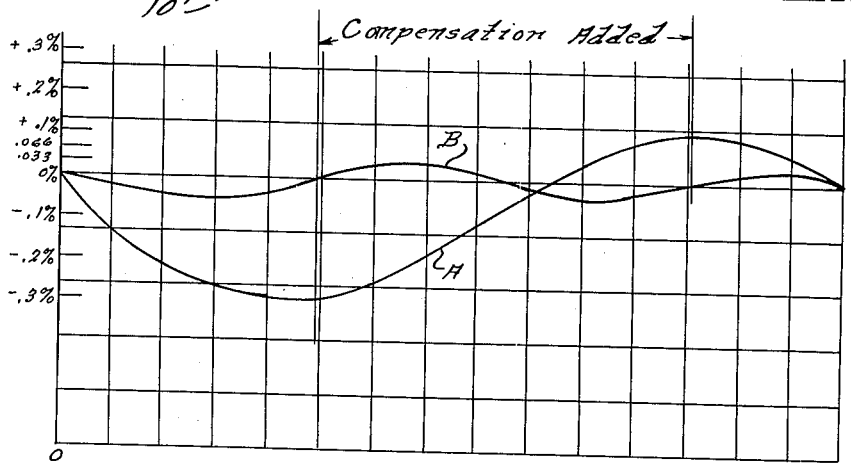
FIGURE 3 is a curve depicting the error present in the system of FIGURE 2 due to loading and nonlinearity and the corresponding curve after the appropriate compensation.

Since most strain gauges are not exactly linear and since the slidewire 164' has the unequal loading mentioned before, compensating resistors are added in a manner similar to that shown in FIGURE 1. The compensating resistors 166', 170', 176', 180', 182', and 184' function in a manner similar to the compensating resistors in FIGURE 1 bearing the corresponding unprimed numbers. Since only one set of load measuring equipment is utilized, only one set of compensating resistors need be shown as indicated by FIGURE 2. However, it should be understood that a plurality of such compensating resistors could be used to accommodate a plurality of load indicating cells. The effect of compensation can be seen in FIGURE 3 wherein the curves are representative of a plot of the percent deviation from the true reading versus the load in percent of maximum load. Curve A represents a plot before compensation and includes the error due to the unequal loading as the wiper 162' moves along the slidewire 164' and also the nonlinearity of the strain gauges. In FIGURE 3, curve B is a plot showing the same relationship as curve A with compensation as shown in FIGURE 2 added and located at the points indicated. From the curve B it can be noted that with the appropriate compensation the percent deviation from the true reading or from linearity from zero to maximum load is less than .03%.

Thus the objects of the invention as initially set forth have been met in that an indicating device has been provided in which the errors due to contact resistance, generated thermal E.M.F.'s, contact potential the loading effects of the various electrical components, nonlinearity of the indicating source, and fluctuation in potential of the power supply have been minimized.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In an electrical device for providing an indication of the magnitude of a quantity detected by sensing means producing a signal having a magnitude varying in accordance with the magnitude of the quantity, the combination of variable voltage means including movable means for producing a varying voltage, voltage dividing means independent of said sensing means comprising a first electrical impedance and a second electrical impedance and responsive to said variable voltage means to produce a varying balancing signal across said second electrical impedance having a magnitude which is less than and varies in accordance with variations of said varying voltage, said movable means operatively associated with said variable voltage means for varying the magnitude of said balancing signal in accordance with the position of said movable means, control means for comparing the sensed signal and said balancing signal, and driving means controlled by said control means and effective in response to the existence of a difference between the magnitudes of said signals for driving said movable means in a direction determined by the polarity of said difference.

2. In an electrical device for providing an indication of the magnitude of a quantity detected by sensing means producing a signal having a magnitude varying in accordance with the magnitude of the quantity, the combination of variable voltage means including movable means for producing a varying voltage, voltage dividing means independent of said sensing means comprising a large electrical impedance and a small electrical impedance and responsive to said variable voltage means to produce a varying balancing signal across said small electrical impedance, movable means operatively associated with said variable voltage means for varying the magnitude of said balancing signal in accordance with the position of said movable means, control means for comparing the sensed signal and said balancing signal, and driving means controlled by said control means and effective in response to the existence of a difference between the magnitudes of said signals for driving said movable means in a direction determined by the polarity of said difference.

3. In an electrical apparatus for providing an indication of the magnitude of a quantity detected by sensing means producing a signal having a magnitude varying in accordance with the magnitude of the quantity, the combination of a slidewire having a movable tap, a voltage divider independent of said sensing means comprising a pair of electrical impedances and being operatively associated with said slidewire for providing across one of said impedances a balancing signal having a magnitude varying in accordance with the variations in position of said movable tap, control means for comparing the sensed signal and said balancing signal and driving means controlled by said control means and effective in response to the existence of a difference between the magnitudes of said signals for driving said movable tap in a direction determined by the polarity of said difference.

4. The combination of claim 3 in which said pair of impedances are electrical resistances and in which the other of said pair of impedances has a high value of resistance relative to the resistance of said one impedance and said slidewire.

5. The combination of claim 4 in which a large potential is impressed across said slidewire with said tap being at a portion of the total potential across said slidewire depending upon its position along the slidewire and with said balancing signal being a small potential across said one impedance and varying in magnitude in accordance with variations in the position of said tap along said slidewire.

6. The combination of claim 5 further including electrical resistance means connected along said slidewire for providing substantial linearity between the variations in position of said tap and the variations in magnitude of the sensed signal.

7. In electrical apparatus for providing an indication of the magnitude of a quantity detected by sensing means producing a signal having a magnitude varying in accordance with the magnitude of the quantity, the combination of potential means, movable means operatively associated with said potential means for providing a balancing signal having a magnitude varying in accordance with the position of said movable means, impedance means selectively connected to said potential means and independent from said movable means for providing substantial linearity between variations of the magnitude of said balancing signal and variations in the position of said movable means as said movable means traverses said potential means, control means for comparing the sensed signal and said balancing signal, and driving means controlled by said control means and effective in response to the existence of a difference between the magnitudes of said signals for driving said movable means in a direction determined by the polarity of said difference.

8. In electrical apparatus for providing an indication of the magnitude of a quantity detected by sensing means producing a signal having a magnitude varying in accordance with the magnitude of the quantity, the combination of potential means for providing a potential varying between two points, movable means operatively associated with said potential means for providing a balancing signal having a magnitude varying in accordance with the position of said movable means, impedance means selectively connected between said points to said potential means and independent from said movable means for providing substantial linearity between the variations in position of said movable means and the variations in magnitude of the quantity, control means for comparing the sensed signal and said balancing signal, and driving means controlled by said control means and effective in response to the existence of a difference between the magnitudes of said signals for driving said movable means in a direction determined by the polarity of said difference.

9. In electrical apparatus for providing an indication of the magnitude of a quantity detected by sensing means producing a signal having a magnitude varying in accordance with the magnitude of the quantity, the combination of potential means including a slidewire, movable means operatively associated with said slidewire for producing a balancing signal having a magnitude varying in accordance with the position of said movable means, electrical resistance means selectively connected along said slidewire for providing substantial linearity between the variations in position of said movable means and the variations in magnitude of the quantity, control means for comparing the sensed signal and said balancing signal, and driving means controlled by said control means and effective in response to the existence of a difference between the magnitudes of said signals for driving said movable means in a direction determined by the polarity of said difference.

10. In an electrical apparatus for providing an indication of the magnitude of a quantity detected by sensing means producing a signal having a magnitude varying in accordance with the magnitude of the quantity, the combination of potential means including a slidewire and a potential divider comprising a large electrical impedance and a small electrical impedance, movable means operatively associated with said slidewire for providing a balancing signal across said small electrical impedance having a magnitude varying in accordance with the position of said movable means, electrical resistance means selectively connected along said slidewire for providing substantial linearity between the variations in position of said movable means and the variations in magnitude of the quantity, control means for comparing the sensed signal and said balancing signal, and driving means controlled by said control means and effective in response to the existence of a difference between the magnitudes of said signals for driving said movable means in a direction determined by the polarity of said difference.

11. The combination of claim 10 in which said electrical resistance means comprises a single electrical resistor.

12. The combination of claim 10 in which said electrical resistance means comprises a plurality of electrical resistors.

13. The combination of claim 10 in which the sensing means is a device for detecting temperature, and further including temperature compensating means variable potential means including a second voltage divider for producing a second signal having a magnitude selected in accordance with a desired reference temperature, said variable potential means including temperature compensating means responsive to a sensed temperature for varying the magnitude of said second signal in accordance with variations in said sensed temperature, and means for combining said sensed signal and said second signal to produce a combined signal, said control means then comparing said combined signal with said balancing signal for producing said output signal.

14. In electrical apparatus for providing an indication of the magnitude of a quantity detected by a resistance bridge-type sensing means producing a signal having a magnitude varying in accordance with the unbalance of the bridge as affected by the magnitude of the quantity, the combination comprising a slide wire resistance connected across two legs of the bridge and having limit positions at opposite ends, movable means including a resistor having a large value of electrical resistance compared to the electrical resistance of said slide wire and connected at the junction of the two legs of the bridge and electrically connectable to various positions along said slide wire between said limit positions in accordance with the position of said movable means, means for producing a signal having a magnitude varying in accordance with the unbalance of the bridge, driving means for driving said movable means in response to said signal in a direction bringing said signal substantially equal to zero and hence balancing the bridge, variable resistance means electrically connected to said bridge and to said slide wire and being selectively variable for calibrating said resistance bridge-type sensing means relative to said slide wire and zero adjustment means electrically connected to said resistance bridge type sensing means and being selectively adjustable for providing a zero adjustment signal to said driving means having a magnitude for causing said driving means to move said movable means to one of said limit positions of said slide wire.

15. In an electrical apparatus for providing an indication of magnitude of a quantity detected by sensing means producing a signal having a magnitude varying in accordance with the magnitude of the quantity, the combination of potential means including a slide wire and a potential divider, said potential divider having a large electrical impedance and a small electrical impedance, movable means operatively associated with said slide wire for providing a balancing signal across said small electrical impedance having a magnitude varying in accordance with the position of said movable means along said slide wire, electrical resistance means selectively connected along said slide wire for providing substantial linearity between movement of said movable means to the various positions along said slide wire and the variations in magnitude of said balancing signal, control means for comparing the sensed signal and said balancing signal, said small electrical impedance being selectively variable for providing a calibration for said balancing signal, and driving means controlled by said control means and effective in response to the existence of a difference between the magnitudes of the signals for driving said movable means in a direction determined by the polarity of said difference.

16. In an electrical apparatus for providing an indication of magnitude of a quantity detected by sensing means producing a signal having a magnitude varying in accordance with the magnitude of the quantity, the combination of potential means including a slide wire and a potential divider, said potential divider having a large electrical impedance and a small electrical impedance, movable means operatively associated with said slide wire for providing a balancing signal across said small electrical impedance having a magnitude varying in accordance with the position of said movable means along said slide wire, electrical resistance means selectively connected along said slide wire for providing substantial linearity between movement of said movable means to the various positions along said slide wire and the variations in magnitude of said balancing signal, said electrical resistance means including a potential divider circuit selectively adjustable for varying the compensation of said slide wire, control means for comparing the sensed signal and said balancing signal, said small electrical impedance being selectively variable for providing a calibration for said balancing signal, and driving means controlled by said control means and effective in response to the existence of a difference between the magnitudes of the signals for driving said movable means in a direction determined by the polarity of said difference.

References Cited by the Examiner

UNITED STATES PATENTS

| | | | |
|---|---|---|---|
| 1,206,304 | 11/1916 | Chubb | 73—361 X |
| 1,614,535 | 1/1927 | Packard | 346—32 |
| 2,096,047 | 10/1937 | Leeds | 73—360 |
| 2,114,330 | 4/1938 | Borden | 73—360 X |
| 2,509,480 | 5/1950 | Vogelsang | 73—361 X |
| 2,696,118 | 12/1954 | Petry | 73—359 |
| 2,711,463 | 6/1955 | Goeppinger et al. | 338—120 |
| 2,757,539 | 8/1956 | Broomell | 73—361 |
| 2,771,579 | 11/1956 | Ruge | 73—88.5 X |
| 2,785,260 | 3/1957 | Matthew | 338—120 |
| 2,815,480 | 12/1957 | Ruge | 73—88.5 X |
| 2,884,786 | 5/1959 | Burk et al. | 73—359 |

FOREIGN PATENTS 556,069   4/1958   Canada.

ISAAC LISANN, *Primary Examiner.*

LOUIS R. PRINCE, *Examiner.*